US007833556B2

(12) United States Patent
Nishide et al.

(10) Patent No.: US 7,833,556 B2
(45) Date of Patent: *Nov. 16, 2010

(54) OIL OR FAT COMPOSITIONS

(75) Inventors: Tsutomu Nishide, Tokyo (JP); Shigemi Tsuchiya, Tokyo (JP); Shin Koike, Tokyo (JP); Yoshinobu Nakajima, Tokyo (JP); Yoshinori Inagawa, Tokyo (JP); Masashi Yano, Tokyo (JP); Yoshio Kawaseki, Tokyo (JP)

(73) Assignee: Kao Corporation, Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 11/743,997

(22) Filed: May 3, 2007

(65) Prior Publication Data

US 2007/0202239 A1 Aug. 30, 2007

Related U.S. Application Data

(62) Division of application No. 10/660,722, filed on Sep. 12, 2003, now Pat. No. 7,232,586.

(30) Foreign Application Priority Data

| Sep. 13, 2002 | (JP) | ............................... 2002-269185 |
| Sep. 20, 2002 | (JP) | ............................... 2002-275805 |
| Oct. 29, 2002 | (JP) | ............................... 2002-313597 |

(51) Int. Cl.
*A23D 9/007* (2006.01)

(52) U.S. Cl. ....................................... 426/115; 426/601

(58) Field of Classification Search ................. 426/601, 426/115
See application file for complete search history.

(56) References Cited

U.S. PATENT DOCUMENTS

| 5,763,028 | A | * | 6/1998 | Matsumoto et al. ......... 428/34.7 |
| 5,879,735 | A | | 3/1999 | Cain et al. |
| 5,976,587 | A | * | 11/1999 | Yamauchi et al. ............ 426/112 |
| 6,139,897 | A | * | 10/2000 | Goto et al. ................... 426/601 |
| 6,448,292 | B2 | | 9/2002 | Koike et al. |
| 6,613,376 | B2 | * | 9/2003 | Smith et al. .................. 426/609 |
| 6,764,707 | B1 | * | 7/2004 | Masui et al. ................. 426/601 |
| 6,844,021 | B2 | | 1/2005 | Koike et al. |
| 7,008,661 | B2 | | 3/2006 | Koike et al. |
| 7,090,886 | B2 | | 8/2006 | Koike et al. |
| 7,141,265 | B2 | | 11/2006 | Sakuma et al. |
| 7,182,971 | B2 | | 2/2007 | Takase et al. |
| 2002/0160093 | A1 | | 10/2002 | Sakai et al. |
| 2003/0096867 | A1 | | 5/2003 | Masui et al. |
| 2003/0099754 | A1 | | 5/2003 | Sakai et al. |
| 2004/0086725 | A1 | * | 5/2004 | Jaccoud ....................... 428/446 |
| 2004/0151824 | A1 | | 8/2004 | Koike et al. |
| 2005/0013848 | A1 | | 1/2005 | Moriwaki et al. |
| 2005/0054621 | A1 | | 3/2005 | Gako-Golan et al. |
| 2005/0137258 | A1 | | 6/2005 | Hase et al. |
| 2005/0148666 | A1 | | 7/2005 | Hase et al. |
| 2005/0256190 | A1 | | 11/2005 | Hase et al. |
| 2005/0277180 | A1 | | 12/2005 | Komatsu et al. |

FOREIGN PATENT DOCUMENTS

| EP | 1 211 305 | 6/2002 |
| JP | 51-112694 | 10/1976 |
| JP | 2-190146 | 7/1990 |
| JP | 3-8431 | 1/1991 |
| JP | 4-34367 | 6/1992 |
| JP | A-04-191039 | 7/1992 |
| JP | 4-261497 | 9/1992 |
| JP | 4-300826 | 10/1992 |
| JP | 7-16051 | 1/1995 |
| JP | 9-154494 | 6/1997 |
| JP | 10-176181 | 6/1998 |
| JP | A-2000-116324 | 4/2000 |
| JP | 2000-255579 | 9/2000 |
| JP | A-2001-275565 | 10/2001 |
| JP | A-2002-034453 | 2/2002 |
| JP | A-2002-138296 | 5/2002 |
| JP | A-2002-138297 | 5/2002 |
| JP | A-2002-206100 | 7/2002 |
| JP | 2002-255249 | * 9/2002 |
| WO | WO 99/48378 | 9/1999 |
| WO | WO 99/59422 | 11/1999 |
| WO | WO 02/11552 | 2/2002 |

OTHER PUBLICATIONS

Sacharow, S. et al. 1970. Food Packaging. AVI Publishing Company, Inc, Westport, CT, p. 245-251.*

(Continued)

*Primary Examiner*—Carolyn A Paden
(74) *Attorney, Agent, or Firm*—Oblon, Spivak, McClelland, Maier & Neustadt, L.L.P.

(57) ABSTRACT

Oil or fat compositions contain the following ingredients:
(A) an oil or fat containing from 60 to 100% by weight of diglyceride, by 100 parts by weight of the oil or fat composition, the diglyceride further comprising fatty acids, wherein the amount of fatty acids that are unsaturated is from 80 to 100 wt. %, by 100 parts by weight of the diglyceride;
(B) from 0.001 to 1% by weight of ingredient (A) of a carboxylic acid selected from $C_{2-8}$ hydroxycarboxylic acids, dicarboxylic acids and tricarboxylic acids, and salts derivatives thereof, and mixtures thereof;
(C) from 0.001 to 5% by weight of ingredient (A) of an antioxidant; and
(D) from 0.05 to 4.7% by weight of ingredient (A) of a plant sterol.

Each of these preferred oil or fat compositions has a high diglyceride content having excellent health-promoting functions, and even in cold temperature areas or high-humidity areas, has improved external appearance, is good in work efficiency during cooking and also in the flavor and texture of cooked foods. Packaged edible oils or fats are also disclosed.

3 Claims, No Drawings

OTHER PUBLICATIONS

Francis, F. 2000. Food Science and Technology, $2^{nd}$ edition, vol. 3, John Wiley & Sons, Inc, New York, p. 1824-1829.*
Bakker, M. editor. 1986. The Wiley Encyclopedia of Packaging Technology.. John Wiley & Sons, New York, . p. 48-53.*
U.S. Appl. No. 11/579,148, filed Oct. 30, 2006, Kohori, et al.
U.S. Appl. No. 12/369,314, filed Feb. 11, 2009, Osaki, et al.
Japanese Office Action, Apr. 28, 2009, 4pp. with English Language Translation (7pp.).
Handbook of Oil, Fat and Oilseeds (in Japanese), p. 237 (May 25, 1988).

* cited by examiner

OIL OR FAT COMPOSITIONS

FIELD OF THE INVENTION

This invention relates to oil or fat compositions and also to packaged edible oils or fats, each having a high diglyceride content.

BACKGROUND OF THE INVENTION

Diglycerides have been found to be effective for improving blood cholesterol levels (WO 99/48378) and also to be effective for curtailing the accumulation of body fat and preventing adiposis (JP-A-04-300826, JP-A-10-176181). These effects are considered to be attributed to the inhibition of an increase in the level of fat in postcibal blood. Further, use of diglycerides in cooking oil is known to bring about such merits that upon frying, foaming is reduced and improved flavor and texture of the fried foods are assured (JP-A-02-190146, JP-A-07-016051, JP-09-154494). In addition, diglycerides are also known to be applicable to emulsified foods (JP-B-04-034367, U.S. Pat. No. 5,879,735, JP-A-03-008431). With the foregoing in mind, oil or fat compositions having a high diglyceride content have found wide spread utility as edible oils or fats for consumer use.

In the meantime, a technique has been disclosed in which an antioxidant and a crystallization inhibitor are added to diglycerides to improve their storage stability (JP-A-10-176181). Another method has also been disclosed, in which an organic acid is added before deodorization step to inhibit disproportionation reaction of the diglyceride to the monoglyceride and the triglyceride in a deodorization step of the oil or fat composition (JP-A-04-261497). Concerning food containers, on the other hand, a barrier resin technique (JP-A-51-112694) and a barrier coating technique (JP-A-2000-255579) for such containers have been disclosed to improve long-term storage stability of food.

As is appreciated from the foregoing, there is an increasing desire not only in Japan, but also in various countries in the world toward the use of diglycerides because of its superb health-promoting functions.

Depending on use conditions or storage conditions, however, the external appearances of oils or fats containing diglycerides may be impaired in some instances, because compared with triglycerides, diglycerides tend to become solid in cold temperature areas or tend to become turbid in high-humidity areas. Further, use of an oil or fat with moisture absorbed therein leads to stronger emission of an unpleasant smell upon cooking so that the flavor of cooked foods may be impaired in some instances.

SUMMARY OF THE INVENTION

The present invention provides an oil or fat composition containing the following ingredients (A), (B), (C) and (D):

(A) an oil or fat containing from about 60 to 100% by weight of diglyceride, by 100 parts by weight of the oil or fat composition, the diglyceride further comprising fatty acids, wherein the amount of fatty acids that are unsaturated is from about 80 to 100 wt. %, by 100 parts by weight of the diglyceride;

(B) from about 0.001 to 1% by weight of ingredient (A) of a carboxylic acid selected from the group consisting of $C_{2-8}$ hydroxycarboxylic acids, dicarboxylic acids, tricarboxylic acids, salts and derivatives thereof, and mixtures thereof;

(C) from about 0.001 to 5% by weight of ingredient (A) of an antioxidant; and (D) from about 0.05 to 4.7% by weight of ingredient (A) of a plant sterol.

The present invention also provides a packaged edible oil or fat composed of:

a container, wherein the container has a moisture permeability index and oxygen permeability index which are not greater than about 1.9 (g/day·m$^2$) and not greater than about 0.8 (cm$^3$/day·m$^2$), respectively; and an oil or fat containing partial glycerides, wherein the glycerides' saturated dissolved-water content is not lower than about 1,500 ppm, and wherein the oil or fat is filled in the container.

DETAILED DESCRIPTION OF THE INVENTION

The present invention relates to an oil or fat composition and also a packaged edible oil or fat, each of which has a high diglyceride content, wherein the oil or fat has excellent health-promoting functions, a good external appearance even in cold temperature areas or high-humidity areas, easy and pleasant to cook with ("work efficiency"), and also gives a good flavor and texture to foods cooked with such oil or fat.

The present inventors investigated to determine causes of the occurrence of turbidity or solidification in oils or fats containing diglycerides. Although not wanting to be limited by theory, concerning solidification in cold temperature areas, diglycerides are considered to be susceptible to solidification through hydrogen bonding between hydroxyl groups because they contain one more hydroxyl group in a molecule compared to conventional oils or fats (e.g. triglycerides). As to turbidity in high-humidity areas, on the other hand, the high compatibility of the hydroxyl groups of diglycerides with water is considered to make an oil or fat more hygroscopic to produce turbidity. Such problems related to the physical properties of the oil or fat (hereinafter, referred to as "external problems") are unique phenomena caused by the higher polarity of diglycerides as compared with triglycerides. It has been found that control of the content of plant sterols in a oil or fat composition containing diglycerides by the addition of a specific organic acid and an antioxidant makes it possible to pronouncedly lessen such external problems, to markedly prevent occurrence of an unpleasant odor while cooking, and further, to significantly improve work efficiency. It has also been found that filling of a oil or fat containing diglycerides in a container having a specific barrier performance also makes it possible to remarkably lessen such external problems, to markedly prevent occurrence of an unpleasant odor upon cooking, and further, protects its contents so that it is improved work efficiency. These findings have led to the completion of the present invention.

The oil or fat composition according to the present invention employs an oil or fat which contains diglycerides in a proportion of from about 60 to 100 wt. % (hereinafter indicated merely by "%"). Oils or fats containing a high content of diglycerides are not usually used in high-humidity areas, although they are used in Japan as described above. Conventionally, it is believed to not have been known at all that turbidity quickly occurs under such conditions.

The oil or fat useful as ingredient (A) in the oil or fat composition according to the present invention contains diglycerides in a proportion of from about 60 to 100%. From the standpoint of physiological effects, industrial productivity and external appearance, however, it is preferred to contain them in a proportion of from about 70 to 100%, more preferably from about 80 to 97%, even more preferably from about 80 to 95%.

Unsaturated fatty acids may amount to from about 80 to 100% of the constituent fatty acids of the diglycerides. From the standpoint of external appearance and physiological effects, however, $C_{10-24}$, preferably $C_{16-22}$ unsaturated fatty acids may preferably amount to from about 90 to 100%, with from about 93 to 98% being more preferred and from about 94 to 98% being even more preferred.

Described specifically for certain diglyercide examples, the content of oleic acid in the fatty acids making up the diglycerides may range from about 20 to 65%, preferably from about 25 to 60%, more preferably from about 30 to 50%, and even more preferably from about 30 to 45% from the standpoint of external appearance and balanced ingestion of fatty acids. From the standpoint of physiological effects, the content of olein-olein diglyceride may preferably be lower than about 45%, with from about 0 to 40% being particularly preferred.

The content of linoleic acid in the fatty acids making up example diglycerides may range from about 15 to 65%, preferably from about 20 to 60%, more preferably from about 30 to 55%, and even more preferably from about 35 to 50% from the standpoint of external appearance and balanced ingestion of fatty acids. Further, from the standpoint of oxidation stability and physiological effects, the weight ratio of linoleic acid/oleic acid may range preferably from about 0.1 to 2.0, more preferably from about 0.25 to 1.8, and even more preferably from about 0.3 to 1.7.

The content of linolenic acid in the fatty acids making up example diglycerides may be from about 15% or lower, preferably from about 0 to 13%, more preferably from about 1 to 10%, and even more preferably from about 2 to 9% from the standpoint of external appearance, balanced ingestion of fatty acids and oxidation stability. Linolenic acid is known to include α-linolenic acid and γ-linolenic acid as isomers, with α-linolenic acid being preferred.

Among the fatty acids making up the diglycerides, the content of saturated fatty acids may preferably be about 20% or lower, more preferably from about 0 to 15%, even more preferably from about 0 to 10%, even more preferably from about 2 to 7%, and even more preferably from about 2 to 6%, by weight of the diglyceride, from the standpoint of external appearance, physiological effects and industrial productivity. Among the saturated fatty acids, $C_{14-24}$, especially $C_{16-22}$ fatty acids are preferred, with palmitic acid and stearic acid being more preferred.

The content of trans acids in the fatty acids making up the diglycerides may preferably range from about 0 to 10%, more preferably from about 0.1 to 5%, and even more preferably from about 0.1 to 3.5% from the standpoint of physiological effects, external appearance and industrial productivity. The remaining constituent fatty acids may preferably be $C_{14-24}$, and more preferably $C_{16-22}$ fatty acids.

From the standpoint of physiological effects, storability, industrial productivity and flavor, the proportion of 1,3-diglycerides in example diglycerides may be preferably about 50% or higher, more preferably from about 60 to 100%, even more preferably from about 65 to 90%, and even more preferably from about 65 to 80%.

The oil or fat useful as ingredient (A) in the present invention may contain triglycerides in a proportion of preferably from about 0 to 40%, more preferably from about 0 to 30%, even more preferably from about 2.9 to 20%, and even more preferably from about 4.9 to 20%, by weight of the oil or fat, from the standpoint of physiological effects, industrial productivity and external appearance.

It is preferred from the standpoint of physiological effects and industrial productivity that $C_{10-24}$, preferably $C_{16-22}$ unsaturated fatty acids amount to from about 80 to 100%, more preferably from about 90 to 100%, even more preferably from about 93 to 100%, even more preferably from about 93 to 98%, and even more preferably from about 94 to 98% of the constituent fatty acids of the triglycerides.

In the oil or fat useful as ingredient (A) in the present invention, the content of monoglycerides may range preferably from about 0 to 10%, more preferably from about 0.1 to 5%, even more preferably from about 0.1 to 1.5%, even more preferably from about 0.1 to 1.3%, and even more preferably from about 0.1 to 1%, by weight of the oil or fat, from the standpoint of flavor, external appearance, emulsification, prevention of smoking, industrial productivity and the like. It is preferred from the standpoint of industrial productivity that the constituent fatty acids of the monoglycerides are the same as those of the diglycerides.

The amount of free fatty acids (and salts thereof) in the oil or fat useful as ingredient (A) in the present invention may be lowered preferably to about 3.5% or less, and may range more preferably from about 0 to 2%, even more preferably from about 0 to 1%, even more preferably from about 0 to 0.5%, and even more preferably from about 0.05 to 0.2%, by weight of the oil or fat, from the standpoint of flavor, prevention of smoking, and industrial productivity.

In all the fatty acids making up the oil or fat useful as ingredient (A) in the present invention, the content of fatty acids containing 4 or more carbon-carbon double bonds may preferably range from about 0 to 40%, more preferably from about 0 to 20%, even more preferably from about 0 to 10%, and even more preferably from about 0 to 1%, with an oil or fat substantially free of fatty acids containing 4 or more carbon-carbon double bonds being even more preferred, from the standpoint of oxidation stability, work efficiency, physiological effects, coloration and the like.

A source of the oil or fat useful as ingredient (A) in the present invention can be either a vegetable or animal oil or fat. Specific sources include rapeseed oil, sunflower oil, corn oil, soybean oil, rice oil, safflower oil, cottonseed oil, and beef tallow. These oils and fats can also be used as sources after adjusting their fatty acid compositions by fractionation, blending, hydrogenation, ester interchange or the like.

The oil or fat useful as ingredient (A) in the present invention can be obtained by an esterifying reaction between fatty acids derived from the above-mentioned oil or fat and glycerin, or an ester interchange reaction between such an oil or fat and glycerin, or a like reaction. Excess monoglycerides formed by the reaction can be eliminated by molecular distillation or chromatography. It is preferred to conduct these reactions with 1,3-selective lipase or the like under enzymatically mild conditions as this procedure is superior in flavor and the like, although the reactions can also be conducted as chemical reactions by making use of an alkali catalyst or the like.

The oil or fat composition according to the present invention contains, as ingredient (B), a carboxylic acid selected from the group consisting of hydroxycarboxylic acids, dicarboxylic acids, tricarboxylic acids, salts and derivatives thereof, and mixtures thereof. The content of the carboxylic acid ranges from about 0.001 to 1 parts by weight, per 100 parts by weight of ingredient (A). From the standpoint of external appearance and oxidation stability, however, the content of the carboxylic acid may range preferably from about 0.0012 to 0.7 part by weight, more preferably from about 0.0015 to 0.5 part by weight, and even more preferably from about 0.0025 to 0.3 part by weight. The carbon number of the carboxylic acid is from 2 to 8, with 2 to 6 being preferred and 4 to 6 being more preferred. Preferred examples include citric acid, succinic acid, maleic acid, oxalic acid, aconitic acid, itaconic acid, citraconic acid, tartaric acid, fumaric acid and malic acid, with citric acid, tartaric acid and malic acid being more preferred.

Examples of the above-described derivatives of $C_{2-8}$ hydroxycarboxylic acids, dicarboxylic acids and tricarboxylic acids include glyceride derivatives such as monoglycerides citrates, diglycerides citrates, monoglycerides succinates and diglycerides succinates. Specifically, monoglyceride citrate (crystal) [product of ADM (Archer Daniels Midland Co.)], purified crystalline monoglyceride citrate (product of Fuso Chemical Co., Ltd.) and "Step SS" (trade name, product of Kao Corporation) can be exemplified as commercial products. Illustrative salts of the above-mentioned carboxylic acids include their alkali metals and alkaline earth metals, with the sodium salts and calcium salts being preferred.

As carboxylic acids, extracts and crude drugs with such carboxylic acids contained therein can also be used. Usable examples of the extracts and crude drugs include products commercially available in the form of powders, concentrates or the like produced by extraction from fruits such as lemons, yuzu (Japanese citrons) and ume (Japanese apricots). These extracts and crude drugs can each be added in such an amount that the content of the carboxylic acid contained therein falls within the above-described range.

The content of the salt of the $C_{2-8}$ hydroxylcarboxylic acid, dicarboxylic acid or tricarboxylic acid may range preferably from about 0.001 to 0.01 part by weight, more preferably from about 0.0012 to 0.007 part by weight, even more preferably from about 0.0015 to 0.0045 part by weight, and even more preferably from about 0.0025 to 0.0034 part by weight, per 100 parts by weight of ingredient (A), from the standpoint of external appearance, oxidation stability, work efficiency and flavor.

The amount of the derivative of $C_{2-8}$ hydroxylcarboxylic acid, dicarboxylic acid or tricarboxylic acid may range preferably from about 0.01 to 1 part by weight, more preferably from about 0.05 to 0.7 part by weight, even more preferably from about 0.1 to 0.5 part by weight, and even more preferably from about 0.15 to 0.3 part by weight per 100 parts by weight of ingredient (A) from the standpoint of external appearance, oxidation stability, work efficiency, flavor and texture.

Combined use of the $C_{2-8}$ hydroxylcarboxylic acid, dicarboxylic acid or tricarboxylic acid or the salts thereof with the derivatives thereof is preferred especially from the standpoint of texture, external appearance, oxidation stability and flavor.

In the present invention, the content of ingredient (B) in the oil or fat composition can be measured by HPLC, colorimetry making use of orthonitrophenylhydrazine, or the like. For example, measurement of the content of citric acid by colorimetry can be carried out in the following manner.

An oil or fat (20 g), which has been heated to 60° C., is placed in a 100-mL separating funnel, and subsequent to the addition of warm water of 60° C. (5 mL), the contents are vigorously shaken for 2 minutes. The resulting mixture is then allowed to stand until it separates into layers, and the lower layer is collected as a sample solution. This sample solution (2 mL), an ONPH solution[1)] (1 mL) and an ETC solution[2)] (1 mL) are placed in a 10-mL graduated flask. After the graduated flask is tightly sealed, its contents are heated at 40° C. for 30 minutes. A 1.5 mol/L solution of sodium hydroxide (1 mL) is then added, followed by heating at 60° C. for 15 minutes. After the mixture is allowed to cool down to room temperature, absorption at 540 nm is measured. From a calibration line prepared using aqueous citric acid solutions, the concentrations of which were known, the content of citric acid is determined in accordance with the following formula:

The content of citric acid in the oil or fat=the amount of citric acid determined from the calibration line÷4

1) ONPH solution: a solution of orthonitrophenyl-hydrazine hydrochloride (ONPH) (53.6 mg) in 0.2 mol/L hydrochloric acid (10 mL).
2) ETC solution: a solution of 1-ethyl-3-(3-dimethylaminopropyl)-carbodiimide hydrochloride (ETC) (287.6 mg) in a 6% aqueous solution (10 mL) of pyridine.

The oil or fat composition according to the present invention also contains an antioxidant as ingredient (C). The antioxidant, in combination with ingredient (B), exhibits synergistic effects, and serves not only to significantly improve work efficiency upon cooking but also to improve the external appearance.

From the standpoint of work efficiency, stability and coloration, the content of the antioxidant as ingredient (C) ranges from about 0.001 to 5 parts by weight per 100 parts by weight of ingredient (A), but may range preferably from about 0.004 to 0.5 part by weight, more preferably from about 0.004 to 0.4 part by weight, and even more preferably from about 0.008 to 0.3 part by weight.

In general, the antioxidant as ingredient (C) can preferably be one useful in foods. Illustrative are vitamin E, buthylhydroxytoluene (BHT), butylhydroxyanisole (BHA), tert-butylhydroquinone (TBHQ), vitamin C and derivatives thereof, phospholipids, and natural antioxidants such as rosemary extract, among which vitamin E, vitamin C and derivatives thereof, and rosemary extract are preferred. It is more preferred to use two or more of these antioxidants in combination.

More specifically, $\alpha$, $\beta$, $\gamma$ or $\delta$-tocopherol or a mixture thereof can be used as vitamin E. From the viewpoint of oxidation stability, $\delta$-tocopherol is particularly preferred. Commercial products of vitamin E can include "E-MIX D" and "E-MIX 80" (trade names, products of Eisai Co., Ltd.), "MDE-6000" (trade name, product of Yashiro Co., Ltd.), and "E-Oil 400" (trade name, product of Riken Vitamin Co., Ltd.)

In the present invention, the content of vitamin E when used may range preferably from about 0.01 to 0.4 part by weight, more preferably from about 0.02 to 0.3 part by weight, and even more preferably from about 0.05 to 0.2 part by weight, all in terms of tocopherol per 100 parts by weight of ingredient (A).

As vitamin C and derivatives thereof, those soluble in oils or fats containing diglycerides are preferred. More preferred are higher fatty acid esters, for example, those having $C_{12-22}$ acyl groups. Particularly preferred are L-ascorbic acid palmitate and L-ascorbic acid stearate, with L-ascorbic acid palmitate being even more preferred.

In the present invention when used, the content of vitamin C or the derivative thereof may range preferably from about 0.004 to 0.1 part by weight, more preferably from about 0.006 to 0.08 part by weight, and even more preferably from about 0.008 to 0.06 part by weight, all in terms of ascorbic acid per 100 parts by weight of ingredient (A).

The oil or fat composition according to the present invention also contains plant sterol as ingredient (D). Plant sterol is an ingredient having a cholesterol-lowering effect and, when used in combination with ingredients (B) and (C), improves the work efficiency and external appearance of the oil or fat containing diglycerides. In the present invention, the content of plant sterol is from about 0.05 to 4.7 parts by weight per 100 parts by weight of ingredient (A), with from about 0.3 to 4.7 parts by weight being preferred. In a commercial oil or fat composition produced using as a raw material fatty acids obtained by distillation, the content of plant sterol may have been lowered in general. In such a case, plant sterol can be added in such an amount that its content falls within a range of from about 0.05 to 4.7 parts by weight.

Examples of plant sterol can include free sterols such as α-sitosterol, β-sitosterol, stigmasterol, campesterol, α-sitostanol, β-sitostanol, stigmastanol, campestanol and cycloartenols, and their esters such as their fatty acid esters, ferulate esters and cinnamate esters.

To the oil or fat composition according to the present invention, a crystallization stabilizer can preferably be added further as optional ingredient (E) to improve its low-temperature stability and high-humidity stability. Examples of the crystallization stabilizer can include polyol fatty acid esters such as polyglyceryl ricinoleate, polyglyceryl fatty acid esters, sucrose fatty acid esters, sorbitan fatty acid esters, polyoxyethylene sorbitan fatty acid esters, and propylene glycol fatty acid esters. Preferred examples of the polyol fatty acid esters can include polyglyceryl fatty acid esters, sucrose fatty acid esters and sorbitan fatty acid esters having HLB values not greater than 4, more preferably from about 0.1 to 3 [as measured by the Griffin's calculation formula reported in J. Soc. Cosmet. Chem., 1, 311 (1949)].

When used in the present invention, it is preferred from the standpoint of improving the stability at low temperatures to contain the crystallization inhibitor in a proportion of from about 0.01 to 2.5 parts by weight, more preferably from about 0.02 to 0.5 part by weight, and even more preferably from about 0.05 to 0.2 part by weight, per 100 parts by weight of ingredient (A).

The oil or fat composition according to the present invention can be obtained by adding the above-described ingredients (B) through (D) to the oil or fat containing diglycerides of the above-described composition and heating and stirring the resultant mixture as needed. Rosemary extract, vitamin C derivative, vitamin E and the like may be added after dissolving them in a solvent beforehand.

The oil or fat composition obtained as described above can be used as an edible oil or fat for various foods, because it is good in external appearance, work efficiency, flavor, texture and the like.

These foods may be oil or fat-containing processed foods, examples of which include health-promoting foods, functional foods and specific health foods which exhibit specific functions to achieve the promotion of health. Specific products include bakery foods such as breads, cakes, biscuits, pies, pizza crusts, and bakery mixes; oil-in-water (o/w) emulsions such as soups, sauces, dressings, mayonnaises, coffee creams (including powder forms), ice creams, and whipped creams; water-in-ol (w/o) emulsions such as margarines, spreads, and butter creams; snacks such as potato chips; confectioneries such as chocolates, caramels, candies, and desserts; processed meat foods such as hams, sausages, and hamburger steaks; milk products such as milk, cheeses, and yogurts; doughs; enrober oils or fats; filling oils or fats; noodles; frozen foods; pouch-packaged foods; drinks; and roux. These oil or fat-containing processed foods can each be produced by adding, in addition to the above-described oil or fat, food materials which are commonly employed in the oil or fat-containing processed food. The oil or fat composition according to the present invention may preferably be added generally in a proportion of from about 0.1 to 100% to a food, with from about 1 to 80% being more preferred, although its proportions varies depending on the kind of food.

The preferred oil or fat compositions according to the present invention can also be used as a food material such as a cooking oil useful for deep-fried foods and pan-fried foods. It is particularly suited for cooking or otherwise preparing delicatessens such as croquettes, tempura (e.g. deep-fried fish and vegetables), fried pork cutlets, kara-age (e.g. foods fried with coating such as wheat flour) fried fish, and egg rolls; snacks such as potato chips, tortilla chips, and fabricated potatoes; fried confectioneries such as fried rice crackers; fried potatoes; fried chicken; donuts; instant noodles; and the like.

When an oil or fat derived from a food material is contained because of the formula of a mix or the like, the weight ratio of the oil or fat derived from the food material to the oil or fat composition according to the present invention may range preferably from about 95:5 to 1:99, more preferably from about 95:5 to 5:95, even more preferably from about 85:15 to 5:95, and even more preferably from about 40:60 to 5:95.

The oil or fat composition according to the present invention may be used in o/w emulsions. The weight ratio of the oil phase to the water phase in each o/w emulsion may range from about 1:99 to 90:10, preferably from about 10:90 to 80:20, and more preferably from about 30:70 to 75:25. An emulsifier may be contained preferably in a proportion of from about 0.01 to 5%, with about 0.05 to 3% being particularly preferred. Examples of the emulsifier include various proteins such as egg proteins, soybean proteins, milk proteins, proteins isolated from these proteins, and (partial) hydrolysates of these proteins; sucrose fatty acid esters; sorbitan fatty acid esters; polyoxyethylene sorbitan fatty acid esters; monoglyceryl fatty acid esters; polyglyceryl fatty acid esters; polyglyceryl ricinoleate; glyceryl organic acid esters; propylene glycol fatty acid esters; and lecithin and enzymatic hydrolysates thereof. A stabilizer may be contained preferably in a proportion of from about 0 to 5%, with from about 0.01 to 2% being particularly preferred. Examples of the stabilizer include thickening polysaccharides and starches, such as xanthan gum, gellan gum, guar gum, carageenan, pectin, tragacanth gum, and glucomannan (konjak mannan). It is also possible to use one or more taste-imparting substances such as salt, sugar, vinegar, fruit juices, and seasonings; fragrance additives such as spices and flavors; color additives, preservatives; and the like. Using these materials, oil or fat-containing o/w foods such as mayonnaises, dressings, coffee creams (including powder forms), ice creams, whipped creams and drinks can be prepared by conventional procedures.

The oil or fat composition according to the present invention may also be used in w/o emulsions. The weight ratio of the water phase to the oil phase in each w/o emulsion may range from about 85:15 to 1:99, preferably from about 80:20 to 10:90, and even more preferably from about 70:30 to 35:65. An emulsifier may be contained preferably in a proportion of from about 0.01 to 5%, with from about 0.05 to 3% being particularly preferred Examples of the emulsifier can include various proteins such as egg proteins, soybean proteins, milk proteins, proteins isolated from these proteins, and (partial) hydrolysates of these proteins; sucrose fatty acid esters; sorbitan fatty acid esters; polyoxyethylene sorbitan fatty acid esters; monoglyceryl fatty acid esters; polyglyceryl fatty acid esters; polyglyceryl ricinoleate; glyceryl organic acid esters; propylene glycol fatty acid esters; and lecithin and enzymatic hydrolysates thereof. It is also possible to use one or more taste-imparting substances such as salt, sugar, vinegar, fruit juices, and seasonings; fragrance additives such as spices and flavors; stabilizers such as thickening polysaccharides and starches; color additives, preservatives; and the like. Using these materials, oil or fat-containing w/o foods such as margarines, spreads, and butter creams can be prepared by conventional procedure.

Further, the troublesome external problem of an oil or fat which contains a high content of diglyceride can also be lessened by filling it in a container having specific barrier functions. Improved effects of a container having specific barrier functions can be exhibited on an oil or fat containing partial glycerides, wherein the glycerides' saturated dissolved-water content is not lower than about 1,500 ppm.

These partial glycerides mean oils or fats with preferably monoglycerides and diglycerides contained therein Preferred are partial glycerides, wherein the glycerides' saturated dissolved-water content is not lower than about 1,500 ppm and can range preferably from about 2,000 to 50,000 ppm, more preferably from about 3,000 to 30,000 ppm, even more preferably from about 5,000 to 20,000 ppm, even more preferably from about 7,000 to 15,000 ppm, and even more preferably from about 8,000 to 10,000 ppm.

The term "saturated dissolved-water content" as used herein means a value determined by placing an oil or fat (50 g) and distilled water (30 mL) in a 100-mL Erlenmeyer flask, stirring them at 50° C. for 5 hours, allowing the resultant mixture to cool down to room temperature, and then measuring the amount of water dissolved in the oil or fat by the Karl Fisher method ("Water content" 2.1.3.4-1996 in "Standard Methods for the Analysis of Fats, Oils and Related Materials" compiled by The Japan Oil Chemists' Society).

As specific examples of oil or fat containing such partial glycerides, diglycerides may be contained in proportions of from about 15 to 100 wt. %. From the standpoint of physiological effects, industrial productivity and external appearance, however, it is desired to contain diglycerides in a proportion of preferably from about 35 to 100 wt. %, more preferably from about 60 to 100 wt. %, even more preferably from about 70 to 97 wt. %, and even more preferably from about 80 to 95 wt. %, by weight of oil or fat. Furthermore, the oil or fat of ingredient (A) may be particularly preferred. This oil or fat may contain carboxylic acid as ingredient (B), an antioxidant as ingredient (C), plant sterol as ingredient (D) and optionally a crystallization inhibitor as ingredient (E) either singly or in combination. The contents of ingredients (B) through (E) can preferably be similar to their corresponding contents in the above-described embodiment. It is, therefore, particularly preferred from the standpoint of external appearance, work efficiency, flavor, texture and storage stability that the oil or fat to be used as the packaged oil or fat is an oil or fat composition containing the above-described ingredients (A) through (D).

The term "moisture permeability index (unit: $g/day \cdot m^2$)" as used herein means the amount of water vapor passed through a membrane-like material of a unit area in a predetermined time as measured by following a JIS (Japanese Industrial Standards) method [Method Z0208—Moisture Permeability Testing Method for Moistureproof Packaging Materials (Cup Method)]. Described specifically, a moistureproof packaging material is arranged as a boundary wall at 40° C., and the air on one side of the boundary wall is maintained at 90% relative humidity while the air on the opposite side of the boundary wall is maintained in a dry state with a desiccant. The weight (g) of water vapor passed through the boundary wall in24 hours is determined, and then, is converted into a value per $m^2$ Of the material. It is this value that is employed as the moisture permeability index of the moistureproof packaging material.

The container for use in a preferred embodiment of the present invention has a water permeability index not greater than about 1.9. From the standpoint of external appearance, work efficiency and storage stability, however, its water permeability index may range preferably from about 0 to 1.5, more preferably from about 0.01 to 1.0, even more preferably from about 0.01 to 0.7, even more preferably from about 0.02 to 0.3, and even more preferably from about 0.05 to 0.2.

In addition to the above-described water permeability index, the container for use in a preferred embodiment of the present invention may preferably have an oxygen permeability not higher than about 0.03. From the standpoint of external appearance, work efficiency and storage stability, however, its oxygen permeability may range preferably from about 0 to 0.02, more preferably from about 0 to 0.01, even more preferably from about 0.0001 to 0.005, even more preferably from about 0.0002 to 0.003, and even more preferably from about 0.0005 to 0.0015.

The term "oxygen permeability" as used herein is a value (unit: $cm^3/day \cdot bottle$) as determined by a JIS method (Method K 7126 B). Described specifically, an apparatus produced by Mocon, Inc. is used, and oxygen is supplied to one side of a specimen (bottle) and nitrogen carrier gas is caused to flow at an equal pressure on the opposite side of the specimen. The volume ($cm^3$) of oxygen permeated through the specimen is measured at 20° C. and 60% relative humidity by using an oxygen sensor. This volume is the oxygen permeability value. In the present invention, this oxygen permeability value is divided by the surface area of the bottle, and the quotient is converted into a value per $m^2$ of the material. This value is employed as an oxygen permeability index (unit: $cm^3/day \cdot m^2$). In addition to the above-described water permeability index, the container for use in the present invention may preferably have an oxygen permeability index of not higher than about 0.8. From the standpoint of external appearance, work efficiency and storage stability, however, its oxygen permeability index may range preferably from about 0 to 0.6, even more preferably from about 0 to 0.4, even more preferably from about 0.01 to 0.2, even more preferably from about 0.02 to 0.15, and even more preferably from about 0.05 to 0.12.

From the standpoint of external appearance, work efficiency, flavor and texture, the packaged edible oil or fat according to the present invention may preferably have a water content of not higher than about 4,000 ppm, more preferably from about 0 to 3,000 ppm, even more preferably from about 100 to 2,000 ppm, and even more preferably from about 200 to 1,700 ppm as measured after being sealed air tight and then stored for 3 months at 40° C. and 75% relative humidity.

The container for is preferred to have high transparency. It is preferred from the standpoint of transparency, storage stability and cost that the Haze value determined by JIS K7105 "Optical Properties Testing Methods (5.5 and 6.4)" is preferably about 65 or lower, more preferably from about 30 or lower, even more preferably about 15 or lower, even more preferably from about 0.1 to 10, and even more preferably from about 0.5 to 5. A Haze value of 10 or lower is particularly preferred, as this value provides an excellent aesthetic sense and facilitates observation of a change in quality or the like of the oil or fat.

The container can be made by choosing suitable materials for an inner layer an intermediate layer and an outer layer, respectively, and, if necessary, bonding them together with an adhesive such that the container so formed is equipped with the above-described barrier performance. As the materials for the inner and outer layers, it is preferred from the standpoint of barrier performance, external appearance, work efficiency, storage stability, feeling in use, and strength to use polypropylene (PP), polyethylene (PE), polyethylene terephthalate (PET), a stretched product thereof, a density-altered product thereof, or a combination of such material with another material. Among these materials, more preferred are polypropylene, stretched polypropylene, polyethylene, stretched polyethylene, high-density polyethylene, medium-density polyethylene, low-density polyethylene, linear low-density polyethylene, and stretched polyethylene terephthalate. Even more preferred examples include polypropylene, stretched polypropylene and high-density polyethylene, with use of high-density polyethylene being particularly preferred.

Carbon films or silicon films may be coated on the inner and outer surfaces of the above-described single-layer resin container or multi-layer resin container to provide a container with the above-described barrier performance. It is also possible to use a single-layer preform. This single-layer preform can be obtained by dry-blending a nylon resin such as a metaxylene-group containing polyamide resin [for example, MXD-6 nylon resin (MxD-6Ny)] with PET resin to have the above-described barrier performance and then molding or otherwise forming the resultant resin blend.

As for the intermediate layer of the container if used in a preferred embodiment of the present invention, use of an ethylene-vinyl alcohol copolymer (EVOH) having a high oxygen barrier property is preferred from the standpoint of barrier performance, external appearance, work efficiency, storage stability and feeling in use. Examples include a saponification product of an ethylene-vinyl alcohol copolymer, which can be obtained, for example, by saponifying an ethylene-vinyl acetate copolymer, the ethylene content of which ranges preferably from about 20 to 60 mol %, and more preferably from about 25 to 50 mol %, such that the saponification degree reaches about 96 mol % or higher, preferably about 99 mol % or higher. Preferably, this copolymer saponification product has such a molecular weight as sufficient to permit formation of films.

Examples other than ethylene-vinyl alcohol copolymer include polyamides such as nylon 6, nylon 6,6, nylon 6/6,6 copolymer, metaxylylene adipamide, nylon 6,10, nylon 11, nylon 12, and nylon 13.

When adhesion with other layer(s) is not available to any sufficient extent as in the case of use of an ethylene-vinyl alcohol copolymer, use of an adhesive is preferred. Examples of adhesives include thermoplastic resins, each of which contains on a backbone or side chains thereof carbonyl groups derived from a carboxylic acid, a carboxamide, a carboxylate ester or the like. Specific examples include ethylene-acrylic acid copolymer, ionically-crosslinked olefin copolymers, maleic-anhydride-grafted polyethylene, maleic-anhydride-grafted polypropylene, acrylic-acid-grafted polyolefins, ethylene-vinyl acetate copolymer, copolymer esters, and copolymer amides. They can be used either singly or in combination. These adhesive resins are useful in lamination by co-extrusion or sandwich lamination. Further, a thermosetting adhesive resin of the isocyanate type, epoxy type or the like can also be used in bonding and laminating a preformed oxygen barrier film with a water barrier film.

Among these, particularly preferred are "ADOMER" (trade mark, product of Mitsui Chemicals, Inc.) and "MODIC" (trade mark, product of Mitsubishi Chemical Corporation), both of which can bond ethylene-vinyl alcohol copolymer.

To impart not only the above-described barrier properties but also transparency to the container, it is preferred to adopt a four-layer structure which includes, for example, layers of polypropylene (PP), which is an oriented thermoplastic resin having high transparency, as an inner and outer layer and a cyclic olefin polymer (COP) layer and an ethylene-vinyl alcohol copolymer (EVOH) layer as intermediate layers. In addition, adhesive layers are interposed between the PP layers, which form the inner layer and outer layer, respectively, and the COP and EVOH layers as the intermediate layers.

Here, the cyclic olefin polymer (COP) is a resin excellent in transparency and water barrier properties. Examples of the COP include "ZEONOR" (trade mark for a cyclo-olefin polymer, product of ZEON CORPORATION) and "AVEL" (trade name for a cyclic olefin copolymer, product of Mitsui Chemicals, Inc.).

The container for use in the present invention can be produced by a method known per se in the art insofar as the container can be provided with the above-described barrier properties and transparency. For the production of a multi-layer extrusion product, for example, it is only necessary to separately melt and knead resins, which correspond to the respective resin layers, in an extruder and then to subject the thus-kneaded resins to extrude through a multi-layer multi-die. For the production of a multi-layer injection molded product, on the other hand, it is only necessary to perform injection molding by co-injection or sequential injection while using injection molding machines as many as the kinds of resins.

The preferred packaged edible oil or fat according to the present invention is good in external appearance, work efficiency, storage stability, flavor, texture, feeling in use, and the like, so that it can also be used as an edible oil or fat even in high-humidity areas. Further, it can also be applied for health-promoting foods, functional foods, specific health foods and the like, all of which exhibit specific functions to achieve promotion of health. As specific products, it can be used as a cooking oil for deep-fried foods, pan-fried foods, broiled foods and the like and further, can also be used in dressings, mayonnaises, chiffon cake, and the like. The preferred packaged edible oil or fat according to the present invention is particularly suited for cooking delicatessens such as croquettes, tempura, fried pork cutlets, kara-age, fried fish, and egg rolls; snacks such as potato chips, tortilla chips, and fabricated potatoes; fried potatoes; fried chicken; donuts; instant noodles; yakisoba (Japanese style noodles cooked with a special kind of sauce, vegetables, meat, etc.); spaghetti; chah-han (Chinese style fried rice cooked with egg and other ingredients such as sliced onion and diced roast pork); dashi-maki tamago (square omlet cooked with soup inside), steak; hamburger steak; grilled slices of meat; stir-fried vegetables; meuniere; fried eggs; okonomiyaki (pancake or pizza-like pies with ingredients of desired choice inside); takoyaki (small balls of a pancake-like texture, with chopped octopus inside); and the like.

The following examples further describe and demonstrate embodiments of the present invention. The examples are given solely for the purpose of illustration and are not to be construed as limitations of the present invention.

EXAMPLES

Example 1

(1) Production of Oils

The following oils were produced.

Oil W

Soybean fatty acids with the content of saturated fatty acids lowered by wintering (455 parts by weight), rapeseed oil fatty acids (195 parts by weight) and glycerin (107 parts by weight) were subjected to esterification at 0.07 hPa and 40° C. for 5 hours by using "Lipozyme IM" (trade name, product of Novo Nordisk Bioindustries, Ltd.). Subsequently, the enzyme was filtered off, molecular distillation was conducted at 235° C., and further, bleaching and water washing were carried out. To 150 parts by weight of the oil, a 10% aqueous solution of citric acid (7.5 parts by weight) was then added. Subsequent to stirring at 60° C. for 20 minutes, dehydration was conducted at 110° C. and 0.27 hPa. The oil was then deodorized at 235° C. for 2 hours to produce Oil W.

Oil X

Rapeseed fatty acids (650 parts by weight) and glycerin (107 parts by weight) were subjected to similar esterification and post-treatments as in Oil W to produce Oil X.

Oil Y

Fatty acids (650 parts by weight), which had been obtained by degradation of hydrogenated rapeseed oil (IV=66), and glycerin (107 parts by weight) were subjected to similar esterification and post-treatments as in Oil X to produce Oil Y.

Oil Z

Soybean fatty acids (650 parts by weight) and glycerin (107 parts by weight) were subjected to similar esterification and post-treatments as in Oil W to produce Oil Z.

(2) Analysis of Constituent Fatty Acids in Diglycerides

Diglyceride fractions in each oil were collected by a column chromatograph (manufactured by Wako Pure Chemical Industries, Ltd.; after triglycerides fractions were eliminated with "Wako Gel C-200" and hexane, the diglyceride fractions were obtained with hexane/diethyl ether (70/30). Following the procedures of "Adjustment Method of Fatty acid Methyl Esters" and "Composition of Fatty Acids" in "Standard Methods for the Analysis of Fats, Oils and Related Materials" compiled by The Japan Oil Chemists' Society, the diglyceride fractions were then analyzed by gas chromatography. From retention times and peak area ratios on a chart so obtained, the distribution of fatty acids in the diglycerides was determined. The analytical results are shown in Table 1.

TABLE 1

|  |  | Oil |  |  |  |
| --- | --- | --- | --- | --- | --- |
|  |  | W | X | Y | Z |
| TG (%) |  | 13.2 | 11.6 | 14.0 | 12.3 |
| DG |  | 85.9 | 87.2 | 84.6 | 86.4 |
| 1,3DG |  | 59.3 | 60.2 | 58.3 | 57.9 |
| MG |  | 0.8 | 1.1 | 1.3 | 1.2 |
| FFA |  | 0.1 | 0.1 | 0.1 | 0.1 |
| Plant sterols (%) |  | 0.3 | 0.3 | 0.2 | 0.2 |
| Citric acid (ppm) |  | 5 | 5 | 5 | 5 |
| Constituent fatty acids (%) |  |  |  |  |  |
| C16:0 |  | 3.1 | 5.2 | 4.4 | 10.7 |
| C18:0 |  | 1.3 | 2.1 | 16.3 | 4.7 |
| C18:1 | Cis | 38.0 | 60.9 | 46.7 | 24.7 |
|  | Trans | 0 | 0 | 26.8 | 0 |
| C18:2 | Cis | 46.7 | 19.2 | 0.3 | 49.6 |
|  | Trans | 1.2 | 1.1 | 1.7 | 2.0 |
| C18:3 | Cis | 6.1 | 7.0 | 0.7 | 3.9 |
|  | Trans | 2.2 | 3.0 | 0.1 | 2.8 |
| Trans fatty acids (%) |  | 3.4 | 4.1 | 28.6 | 4.8 |

Example Products 1-6 & Comparative Products 1-3

To Oil W, Oil X and Oil Y (each, 100 parts by weight), vitamin E, vitamin C, citric acid and a plant sterol were added to produce Example Products 1-6 and Comparative Products 1-3. A formula table is shown in Table 2.

TABLE 2

|  | Example Products |  |  |  |  |  | Comparative Products |  |  |
| --- | --- | --- | --- | --- | --- | --- | --- | --- | --- |
|  | 1 | 2 | 3 | 4 | 5 | 6 | 1 | 2 | 3 |
| Oil W | 100 | — | — | 100 | 100 | 100 | — | 100 | 100 |
| Oil X | — | 100 | 100 | — | — | — | — | — | — |
| Oil Y | — | — | — | — | — | — | 100 | — | — |
| Citric acid[1] | 0.002 | 0.002 | 0.002 | 0.002 | 0.003 | 0.0015 | — | — | — |
| Glyceryl citrate stearate[2] | 0.4 | — | — | — | — | — | — | — | — |
| Glyceryl citrate oleate[3] | — | 0.25 | — | — | — | — | — | — | — |
| Glyceryl succinate stearate[4] | — | — | — | 0.25 | 0.25 | 0.25 | — | — | — |
| Vitamin E[5] | 0.1 | 0.15 | 0.15 | 0.2 | 0.2 | 0.2 | — | — | 0.2 |
| Vitamin C derivative[6] | 0.015 | 0.05 | 0.05 | 0.025 | 0.025 | 0.025 | — | — | 0.025 |
| Polyglyceryl fatty acid ester[7] | — | — | — | 0.075 | 0.075 | — | — | — | — |
| Polyglyceryl fatty acid ester[8] | — | — | — | — | — | 0.075 | — | — | — |
| Plant sterol[9] | — | — | — | — | 4.0 | — | — | — | — |

[1] "Citric Acid" (trade name, product of ADM (Archer Daniels Midland Co.))
[2] "Sun Soft 621 B" (trade name, product of TAIYO KAGAKU CO., LTD.)
[3] "Poem K-37" (trade name, product of Riken Vitamin Co., Ltd.)
[4] "Step SS" (trade name, product of Kao Corporation)
[5] "E Oil 400" (trade name, product of Riken Vitamin Co., Ltd.)
[6] "Vitamin C Palmitate" (trade name, product of Roche Vitamins Ltd.)
[7] "THL-3" (trade name, product of Sakamoto Yakuhin Kogyo Co., Ltd.)
[8] "QMP-5" (trade name, product of TAIYO KAGAKU CO., LTD.)
[9] "Phytosterol S" (trade name, product of Tama Biochemical Co., Ltd.)

Example 2

Cooking Test

The oil compositions described in Table 2 were stored without stoppers in an environment of 40° C. and 75% relative humidity. Their water contents were measured with time by the Karl Fisher method to produce oils having a 0.2% water content.

Separately using the oils having a 0.2% water content, cooking was conducted in the order of tempura, fried pork fillet and fried chicken by methods to be described below. Emission of an unpleasant odor upon cooking and the flavors and textures of the cooked foods were organoleptically ranked.

| Amount of oil: | 600 g (Chinese frying pan) | |
|---|---|---|
| Temperature of oil: | 180° C., heated on a gas cooking stove (medium flame) | |
| <Tempura> | | |
| Cooking ingredients: | Shrimps (black tiger) | 8 |
| | Lotus root (sliced) | 8 |
| | Pumpkin (sliced) | 8 |
| | Green onions (each cut in halves) | 8 |
| | Egg plants (each cut in halves) | 8 |
| Batter: | Wheat flour | 100 g |
| | Eggs | 50 g |
| | Water | 150 g |
| <Fried pork fillets> | | |
| Cooking ingredients: | Pork fillets (cut in 2 cm thick round slices) | |
| Coating: | The pork fillet slices were each coated with wheat flour, beaten eggs and bread crumbs in this order. | |

After cooking the tempura as described above, the oils were individually stored at room temperature for 1 week in oil pots. To 300 g aliquots of the oils, the corresponding oils (300 g, each) shown in Table 2 were added, and fried pork fillets were cooked at 180° C.

| <Fried chicken> |
|---|
| Cooking ingredient: Chicken (dark meat) (bite-size) |
| Coating: The frying ingredient was coated with a frying mix (product of Nisshin Flour Milling Co., Ltd.) |

After cooking the fried pork fillets as described above, the oils were individually stored at room temperature for 1 week in oil pots. To 300 g aliquots of the oils, the corresponding oils (300 g, each) shown in Table 2 were added, and fried chicken was cooked at 180° C.

At the time of the completion of the cooking, the edible oils were ranked based on the emission of an unpleasant odor and also in the flavors and textures of the fried foods by 10 panelists in accordance with the following ranking standards.

(Emission of Unpleasant Odor Upon Cooking)

A: Extremely good without any unpleasant odor or deteriorated odor.

B: Good without a substantial unpleasant odor or deteriorated odor.

C: An unpleasant odor or deteriorated odor is felt a little.

D: An unpleasant odor or deteriorated odor is felt.

(Flavors and Textures of Cooked Foods)

A: Extremely good without any unpleasant taste such as an acidic taste or bitter taste or substantial greasiness.

B: Good without a substantial unpleasant taste such as an acidic taste or bitter taste or substantial greasiness.

C: An unpleasant taste such as an acidic taste or bitter taste or greasiness is felt a little.

D: An unpleasant taste such as an acidic taste or bitter taste or greasiness is felt, and the flavor is poor.

As shown in Table 4, the resultant, cooked foods were all good in flavor, external appearance and the like. Further, the smell of the edible oils during the cooking was also good. The edible oils according to the present invention were successfully used for the edible oil applications.

TABLE 3

| | | Example products | | | | | | Comparative products | | |
|---|---|---|---|---|---|---|---|---|---|---|
| | | 1 | 2 | 3 | 4 | 5 | 6 | 1 | 2 | 3 |
| Tempura | Emission of unpleasant odor upon cooking | B | B | B | B | A | B | D | D | C |
| | Flavor and texture of cooked food | A | A | B | A | A | A | D | D | C |
| Fried pork fillet | Emission of unpleasant odor upon cooking | B | B | B | B | A | B | D | D | D |
| | Flavor and texture of cooked food | B | A | B | A | A | A | D | D | C |
| Fried chicken | Emission of unpleasant odor upon cooking | B | B | B | B | B | B | D | D | D |
| | Flavor and texture of cooked food | B | B | B | B | A | B | D | D | D |

Example 3

Low-Temperature Storage Test

The oil compositions of the formulas shown in Table 2 (Example Products 4, 6, and Comparative Products 1,3) were individually placed in glass-made sample bottles, and the bottles were tightly sealed. Subsequent to storage at 0° for 24 hours, conditions of the oil compositions were visually observed.

TABLE 4

| Example products | | Comparative products | |
|---|---|---|---|
| 4 | 6 | 1 | 3 |
| Clear | Clear | Solidified | Turbid |

As a result, the oil compositions which contained ingredients (A), (B), (C) and (D) as in the present invention did not develop turbidity even under the low-temperature storage conditions as shown in Table 4.

Example 4

Mayonnaise

| | (parts by weight) |
|---|---|
| Oil (Example Product 6) | 65.0 |
| Egg yolk (phospholipase treated) | 15.0 |
| Vinegar (acidity: 10%) | 7.0 |
| Sugar | 1.0 |
| Sodium glutamate | 0.4 |
| Salt | 0.3 |
| Mustard (powder) | 0.3 |
| Thickener (xanthan gum) | 0.1 |
| Water | 10.9 |

The materials other than the oil was agitated and mixed in a homomixer. The oil was then added dropwise, followed by pre-emulsification in the homomixer. The thus-obtained pre-emulsified mixture was homogenized in a colloid mill to produce mayonnaise (pH 4.0). The mayonnaise so obtained was good in flavor, external appearance, emulsion properties and the like. The oil composition according to the present invention was successfully used for the o/w emulsion application Example 5

Spread

| | (parts by weight) |
|---|---|
| (Oil phase) | |
| Oil (Example Product 4) | 33.38 |
| Hydrogenated palm oil (IV = 2) | 4 |
| Hydrogenated soybean oil (IV = 43) | 2 |
| Monoglycerides | 0.5 |
| Lecithin | 0.5 |
| Polyglyceryl ricinoleate | 0.5 |
| Flavor | 0.1 |
| Vitamin E | 0.02 |
| (Water phase) | |
| Distilled water | 57.4 |
| Skimmilk powder | 0.3 |
| Salt | 1.3 |

The oil phase and water phase were prepared, and were then mixed and emulsified by a homomixer. The thus-obtained emulsion was quickly chilled by conventional procedure to plasticize the same and hence, to prepare a spread. The spread so obtained was good in flavor, external appearance, emulsion properties and the like. The oil composition according to the present invention was successfully used for the w/o emulsion application.

Example 6
Barrier Properties Ranking Test of Containers

The following Bottles a to g were measured for water permeability index, oxygen permeability and oxygen permeability index. The results are shown in Table 5.

| Bottle a: | Inner layer/outer layer: high-density polyethylene<br>Intermediate layer: ethylene-vinyl alcohol copolymer |
|---|---|
| Bottle b: | Inner layer/outer layer: polypropylene<br>Intermediate layer: ethylene-vinyl alcohol copolymer |
| Bottle c: | Polyethylene terephthalate + carbon films |
| Bottle d: | Polyethylene terephthalate + silicon films |
| Bottle e: | Single-layer preform molded by dry-blending MxD-6Ny resin with polyethylene terephthalate. |
| Bottle f: | Inner layer/outer layer: polypropylene<br>Intermediate layer 1: ethylene-vinyl alcohol copolymer<br>Intermediate layer 2: cyclic olefin polymer |

[Measuring Method of Water Permeability Index]

Based on the JIS Z0208 method [Moisture Permeability Testing Method for Moistureproof Packaging Materials (Cup Method), a measurement was conducted as will be described hereinafter A desiccant (calcium chloride—anhydrous) was placed in a test bottle (to 20 wt. % of fully-filled volume). A heat-sealable aluminum foil was placed over then opening of the test bottle. Using an iron, the bottle opening was tightly sealed with the aluminum foil. The test bottle was placed in a constant-temperature, constant-humidity chamber maintained at 40±0.5° and 90±2% R.H. After the test bottle was allowed to stand for 16 hours or longer in the constant-temperature, constant-humidity chamber, the test bottle was taken out of the chamber and then stored in a desiccator (with silica gel placed inside) to have its temperature equilibrated with room temperature. The weight was measured by a balance, and was recorded as an initial weight. The test bottle was placed again in the constant-temperature, constant-humidity chamber, and at an interval of 24 hours, the test bottle was taken out of the chamber and was weighed. This procedure was repeated to measure increases in the weight of the test bottle. In the course of the test, weight increases per unit time were determined by every two successive weighing operations. The test was continued until such weight increases became constant within a 5% range.

Water permeability index was determined by dividing the thus-obtained weight increase (g) of the test bottle per day (24 hours) with the surface area ($m^2$) of the bottle.

[Measuring Method of Oxygen Permeability]

Oxygen permeability was measured in accordance with the JIS K 7126B method. The value so measured was divided by the surface area of the test bottle to determine its oxygen permeability index.

[Measuring Method of Transparency]

Haze value was determined in accordance with the JIS K 7105 method—Optical Properties Testing Methods (5.5 and 6.4).

TABLE 5

|  | Bottle | Water permeability index (g/daym$^2$) | Oxygen permeability (mL/day · bottle) | Oxygen permeability index (g/daym$^2$) | Transparency Haze value |
| --- | --- | --- | --- | --- | --- |
| Example products | a | 0.22 | 0.002 | 0.112 | 73 |
|  | b | 0.50 | 0.002 | 0.094 | 25 |
|  | c | 0.95 | 0.003 | 0.116 | 1.8 |
|  | d | 1.24 | 0.004 | 0.114 | 1.0 |
|  | e | 1.62 | 0.015 | 0.515 | 80 |
|  | f | 0.20 | 0.005 | 0.112 | 5.0 |
| Comparative products | g | 2.00 | 0.035 | 0.902 | 1.1 |

Example 7

Edible Oils 1-4

To OilW, Oil X and Oil Z (each, 100 parts by weight), vitamin E, a vitamin C derivative, organic acids and a plant sterol were added to produce Edible Oils 1-4. A formula table is shown in Table 6. Corn oil (product of The Nisshin OilliO, Ltd.) was provided as Edible Oil 5. The saturated dissolved-water contents of Edible Oils 1 and 5 were also measured. As a result, they were found to be 8,900 ppm (Edible Oil 1) and 1,000 ppm (Edible Oil 5).

TABLE 6

|  | Edible oil | | | | |
| --- | --- | --- | --- | --- | --- |
|  | Example products | | | | Comp. products |
| Part(s) by weight | 1 | 2 | 3 | 4 | 5 |
| Oil W | 100 | — | — | 100 | — |
| Oil X | — | 100 | — | — | — |
| Oil Z | — | — | 100 | — | — |
| Corn oil | — | — | — | — | 100 |
| plant sterol[1] | — | — | 4.0 | — | — |
| Citric acid[2] | 0.002 | 0.002 | — | 0.0015 | — |
| Glyceryl succinate stearate[3] | 0.25 | — | — | 0.25 | — |
| Vitamin E[4] | 0.2 | 0.2 | 0.15 | 0.2 | — |
| Vitamin C derivative[5] | 0.025 | 0.025 | 0.05 | 0.025 | — |
| Polyglyceryl fatty acid ester[6] | 0.075 | — | — | — | — |

TABLE 6-continued

|  | Edible oil | | | | |
| --- | --- | --- | --- | --- | --- |
|  | Example products | | | | Comp. products |
| Part(s) by weight | 1 | 2 | 3 | 4 | 5 |
| Polyglyceryl fatty acid ester[7] | — | — | — | 0.075 | — |

[1]"Phytosterol S" (trade name, product of Tama Biochemical Co., Ltd.)
[2]"Citric Acid" (trade name, product of ADM (Archer Daniels Midland Co.)
[3]"Step SS" (trade name, product of Kao Corporation)
[4]"E Oil 400" (trade name, product of Riken Vitamin Co., Ltd.)
[5]"Vitamin C Palmitate" (trade name, product of Roche Vitamins Ltd.)
[6]"THL-3" (trade name, product of Sakamoto Yakuhin Kogyo Co., Ltd.)
[7]"QMP-5" (trade name, product of TAIYO KAGAKU CO., LTD.)

Example 8
High-Humidity Storage Test

As shown in Table 7, Edible Oils 1-5 produced in Example 7 were filled in the corresponding Containers a, b, and g of Example 6, respectively. Those containers were tightly sealed to produce packaged edible oils (I-VI). Those packaged edible oils were stored at 40° C. and 75% R.H. for 3 months, and the water contents and peroxide values (POVs) of the edible oils were measured. Subsequent to the storage, the oils were also placed in glass-made sample bottles. The sample bottles were tightly sealed and then allowed to stand at room temperature. Subsequently, they were visually ranked in external appearance.

As a result, as shown in Table 7, the example products were all inhibited from moisture absorption, and were good in external appearance.

TABLE 7

|  |  | Bottle | Edible oil | Water content, ppm[1] | | POV[2] | | External appearance |
| --- | --- | --- | --- | --- | --- | --- | --- | --- |
|  |  |  |  | Initial value | 3 months later | Initial value | 3 months later |  |
| Example products | I | a | 1 | 203 | 1043 | tr[3] | 0.9 | Clear |
|  | II | a | 2 | 203 | 1357 | tr | 0.8 | Clear |
|  | III | b | 3 | 203 | 1951 | tr | 0.8 | Clear |
|  | IV | a | 4 | 210 | 1068 | tr | 0.9 | Clear |

TABLE 7-continued

| | Bottle | Edible oil | Water content, ppm[1] Initial value | Water content, ppm[1] 3 months later | POV[2] Initial value | POV[2] 3 months later | External appearance |
|---|---|---|---|---|---|---|---|
| Comp. products | V | g | 1 | 203 | 4410 | tr | 2.0 | Turbid |
| | VI | g | 5 | 400 | 905 | tr | 3.8 | Clear |

[1] Measured by Method 2.1.3.4-1996 of "Standard Methods for the Analysis of Fats, Oils and Related Materials" (compiled by The Japan Oil Chemists' Society)
[2] Measured by Method 2.5.2.1-1996 of "Standard Methods for the Analysis of Fats, Oils and Related Materials" (compiled by The Japan Oil Chemists' Society)
[3] trace Example 9

Frying Test

Separately using the packaged edible oils (I-V) stored (for 3 months) under the conditions of Example 8, frying (tempura) was conducted by a method to be described below.

| | |
|---|---|
| Amount of oil: | 600 g (Chinese frying pan) |
| Temperature of oil: | 180° C., heated on a gas cooking stove (medium flame) |
| <Tempura> | |
| Frying ingredients: | Shrimps (black tiger) 8 |
| | Lotus root (sliced) 8 |
| | Pumpkin (sliced) 8 |
| | Green onions 8 |
| | (each cut in halves) |
| | Egg plants 8 |
| | (each cut in halves) |
| Batter: | Wheat flour 100 g |
| | Eggs 50 g |
| | Water 150 g |

At the time of the completion of the frying, the edible oils were ranked based on emission of an unpleasant odor and also in the flavor and texture of the fried food by 10 panelists in accordance with the following ranking standards. The results are shown in Table 8.

(Smell of Edible Oil at the Time of Completion of Frying)

A: Extremely good without any unpleasant odor or deteriorated odor.

B: Good without a substantial unpleasant odor or deteriorated odor.

C: An unpleasant odor or deteriorated odor is felt a little.

D: An unpleasant odor or deteriorated odor is felt.

(Flavors and Textures of Fried Food)

A: Extremely good without any unpleasant taste such as an acidic taste or bitter taste or substantial greasiness.

B: Good without a substantial unpleasant taste such as an acidic taste or bitter taste or substantial greasiness C: An unpleasant taste such as an acidic taste or bitter taste or greasiness is felt a little.

D: An unpleasant taste such as an acidic taste or bitter taste or greasiness is felt, and the flavor is poor.

The fried food obtained by using the packaged edible oil according to embodiments the present invention was good in both flavor and texture. Further, the smell of the edible oil after the frying was also good.

TABLE 8

| | Example products | | | | Comp. products |
|---|---|---|---|---|---|
| | I | II | III | IV | V |
| Smell at the time of completion of cooking | A | A | B | A | D |
| Flavor and texture of the cooked food | A | A | A | A | C |

According to the preferred embodiments of the present invention, it is possible not only to markedly improve the problem of external appearance typical to diglycerides but also to pronouncedly prevent occurrence of an unpleasant odor during cooking and hence, to substantially improve work efficiency by combining a specific organic acid, an antioxidant and a plant sterol with an oil or fat, which contains diglycerides, having an effect to curtail accumulation of body fat and to prevent adiposis, and optionally further contained in a specific container.

What is claimed is:

1. A packaged edible oil or fat comprising:

a bottle container selected from the group consisting of i) a resin bottle container comprising an inner layer, an intermediate layer and an outer layer, and ii) a resin bottle container having an inner and an outer surface and having independently coated on surfaces of said inner and outer surfaces at least one film selected from the group consisting of a carbon film and a silicon film, wherein the bottle container has a moisture permeability index and an oxygen permeability index of which are not greater than about 1.9 (g/day·m$^2$) and not greater than about 0.8 (cm$^3$/day·m$^2$) respectively; and an oil or fat composition in said bottle container, said oil or fat composition comprising the following (A), (B), (C) and (D):

(A) an oil or fat containing from 60 to 100% by weight of diglyceride, by 100 parts by weight of said oil or fat composition, said diglycerides further comprising fatty acids, wherein an amount of fatty acids that are unsaturated is from 80 to 100 wt. %, by 100 parts by weight of said diglycerides;

(B) from 0.001 to 1% by weight of ingredient (A) of a carboxylic acid selected from the group consisting of $C_{2-8}$ hydroxycarboxylic acids, dicarboxylic acids and tricarboxylic acids, and salts derivatives thereof, and mixtures thereof (C) from about 0.001 to 5% by weight of ingredient (A) of an antioxidant; and (D) from 0.05 to 4.7% by weight of ingredient (A) of a plant sterol wherein the glycerides' saturated dissolved-water content is not lower than about 1,500 ppm.

2. The packaged edible oil or fat according to claim 1, wherein said bottle container comprises an inner layer, an intermediate layer and an outer layer and said inner layer and said outer layer are each independently a material selected from the group consisting of polypropylene (PP), polyethylene (PE), polyethylene terephthalate (PET), stretched polypropylene, stretched polyethylene, high-density polyethylene, medium-density polyethylene, low-density polyethylene, linear low-density polyethylene, stretched polyethylene terephthalate and or a combination thereof.

3. The packaged edible oil or fat of claim 1, wherein said intermediate layer is an ethylene-vinyl alcohol copolymer.

* * * * *